United States Patent
Tanoura et al.

(10) Patent No.: US 9,051,863 B2
(45) Date of Patent: Jun. 9, 2015

(54) FLUE GAS PURIFYING DEVICE

(75) Inventors: Masazumi Tanoura, Kanagawa (JP); Kenji Muta, Kanagawa (JP); Minoru Danno, Kanagawa (JP); Masatoshi Katsuki, Kanagawa (JP); Yuuko Ujihara, Kanagawa (JP); Daishi Ueno, Tokyo (JP); Takashi Fujinaga, Hyogo (JP); Eiji Kato, Hyogo (JP); Shinichiro Asami, Hyogo (JP); Tadashi Aoki, Hyogo (JP); Kageharu Moriyama, Kanagawa (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 805 days.

(21) Appl. No.: 13/147,109
(22) PCT Filed: Jan. 27, 2010
(86) PCT No.: PCT/JP2010/051045
§ 371 (c)(1),
(2), (4) Date: Jul. 29, 2011
(87) PCT Pub. No.: WO2010/087369
PCT Pub. Date: Aug. 5, 2010

(65) Prior Publication Data
US 2011/0293483 A1 Dec. 1, 2011

(30) Foreign Application Priority Data
Jan. 30, 2009 (JP) .................. 2009-020324

(51) Int. Cl.
*F01N 3/20* (2006.01)
*F01N 3/08* (2006.01)
*B01D 53/94* (2006.01)

(52) U.S. Cl.
CPC ............ *F01N 3/208* (2013.01); *B01D 53/9431* (2013.01); *B01D 2251/2067* (2013.01);
(Continued)

(58) Field of Classification Search
CPC ....... F01N 3/208; F01N 3/206; F01N 3/0821; F01N 2610/02; F01N 2610/14; F01N 2560/021; B01D 53/9431; B01D 2251/2067; B01D 2258/012

USPC .................. 422/111, 171; 423/213.2, 213.7; 60/286, 295, 301
See application file for complete search history.

(56) References Cited

U.S. PATENT DOCUMENTS 5,369,956 A * 12/1994 Daudel et al. .................. 60/286
(Continued)

FOREIGN PATENT DOCUMENTS

JP 2000-265828 A 9/2000
(Continued)

OTHER PUBLICATIONS

Japanese Notice of Allowance mailed May 21, 2013, issued in corresponding Japanese Patent Application No. 2009-020324; w/partial English translation (3 pages).
(Continued)

*Primary Examiner* — Jill Warden
*Assistant Examiner* — Joye L Woodard
(74) *Attorney, Agent, or Firm* — Westerman, Hattori, Daniels & Adrian, LLP (57) ABSTRACT

An object of the present invention is to provide a flue gas purifying device that can efficiently decrease nitrogen oxides in flue gas. This object is solved by including: an exhaust pipe that guides flue gas discharged from a burning appliance; a urea-water injecting unit that injects urea water into the exhaust pipe; a catalytic unit arranged on a downstream side to a position where urea water is injected in a flow direction of flue gas and having a urea SCR catalyst; a first ammonia-concentration measuring unit that measures a concentration of ammonia in flue gas at a measurement position in a region where the catalytic unit is arranged; a second ammonia-concentration measuring unit arranged on a downstream side to the catalytic unit in a flow direction of the flue gas, to measure a concentration of ammonia in the flue gas having passed through the urea SCR catalyst; and a control unit that controls injection of urea water by the urea-water injecting unit based on measurement results acquired by the first and second ammonia-concentration measuring units.

11 Claims, 3 Drawing Sheets

(52) U.S. Cl.
CPC ........ *B01D2258/012* (2013.01); *F01N 3/0821* (2013.01); *F01N 2560/021* (2013.01); *F01N 2610/02* (2013.01); *F01N 2610/14* (2013.01); *Y02T 10/24* (2013.01)

(56) References Cited

U.S. PATENT DOCUMENTS

| | | | |
|---|---|---|---|
| 6,761,025 B1* | 7/2004 | Gladden | 60/286 |
| 2002/0182127 A1* | 12/2002 | Braun et al. | 422/172 |
| 2007/0144151 A1 | 6/2007 | Lueders et al. | |
| 2008/0022658 A1* | 1/2008 | Viola et al. | 60/286 |
| 2008/0022659 A1 | 1/2008 | Viola et al. | |
| 2009/0301067 A1 | 12/2009 | Dingle et al. | |

FOREIGN PATENT DOCUMENTS

| | | |
|---|---|---|
| JP | 2002-266627 A | 9/2002 |
| JP | 2005-169331 A | 6/2005 |
| JP | 2007-154849 A | 6/2007 |
| JP | 2007-170383 A | 7/2007 |
| JP | 2009-293619 A | 12/2009 |

OTHER PUBLICATIONS

International Search Report of PCT/JP2010/051045, mailing date May 11, 2010.
Written Opinion of PCT/JP2010/051045, mailing date May 11, 2010.
Chinese Office Action dated Feb. 4, 2013, issued in corresponding Chinese Patent Application No. 201080005861.9, w/ English translation.
Notification of the Decision to Grant a Patent Right for Patent for Invention dated Mar. 17, 2014, issued in corresponding Chinese Patent Application No. 201080005861.9, w/English translation (4 pages).

* cited by examiner

FLUE GAS PURIFYING DEVICE

FIELD

The present invention relates to a flue gas purifying device that reduces nitrogen oxides discharged from a burning appliance.

BACKGROUND

Gas discharged from burning appliances such as an internal combustion engine, a waste incinerator, and a gas turbine, that is flue gas, contains nitrogen oxides (NOx). Therefore, a device that decreases nitrogen oxides is provided in an exhaust pipe of a burning appliance. As an example of the device that decreases nitrogen oxides, there is a device that decreases nitrogen oxides from flue gas by injecting urea into an exhaust pipe that guides flue gas, produces ammonia from urea in the exhaust pipe, causes the produced ammonia to react with nitrogen oxides in flue gas, and then removes oxygen from nitrogen oxides to produce nitrogen again.

For example, Patent Literature 1 describes a flue gas purifying device in which a DPF device and a selective catalytic reduction catalytic device are sequentially arranged from an upstream side in an exhaust path of an internal combustion engine. Patent Literature 1 also describes a device that calculates NOx emissions, at the time of a normal operation, based on an NOx emissions map for the normal operation, or at the time of forced regeneration of the DPF device, calculates NOx emissions based on an NOx emissions map for forced regeneration, to calculate a feed rate of ammonia aqueous solution corresponding to the calculated NOx emissions, and feeds ammonia aqueous solution into flue gas on an upstream side of the selective catalytic reduction catalytic device so as to reach the calculated feed rate.

Further, Patent Literature 2 describes NOx removal equipment for flue gas discharged from a combustion plant such as a waste incinerator. Patent Literature 2 describes a denitration control method in which a NOx concentration in gas before treatment, an ammonia concentration in treated flue gas, a NOx concentration in flue gas, and a flow rate of flue gas are measured, to calculate a flow rate of NOx before treatment, a NOx concentration after treatment, a record of NOx removal efficiency by NOx removal equipment, and an ammonia concentration in treated flue gas based on a measurement result thereof, deviations between the calculated values and target concentrations thereof are respectively calculated to thereby calculate correction values based on the calculated deviations, and a corrected flow rate of NOx is calculated based on at least one of the calculated correction values, thereby controlling a flow rate of ammonia to be injected into flue gas before treatment based on the calculated corrected value of NOx.

CITATION LIST

Patent Literature

Patent Literature 1: Japanese Patent Application Laid-open No. 2007-154849
Patent Literature 2: Japanese Patent Application Laid-open No. 2005-169331

SUMMARY

Technical Problem

As described in Patent Literature 1, nitrogen oxides can be decreased by controlling an injection amount of urea based on a map created beforehand, and an amount of ammonia can be also adjusted. As described in Patent Literature 2, nitrogen oxides can be decreased as well by using at least one of the concentrations of nitrogen oxides, NOx removal efficiency, and an ammonia concentration in treated flue gas to correct a deviation of flow rate of nitrogen oxides, and the amount of ammonia can be also adjusted.

However, even if the injection amount of urea is adjusted based on the map created beforehand as described in Patent Literature 1, there are problems such as leakage of nitrogen oxides and leakage of ammonia according to operating conditions. To calculate the flow rate of NOx as described in Patent Literature 2, a calculation needs to be performed by detecting a flow rate of flue gas and the concentration of NOx (nitrogen oxides), thereby causing a problem that the calculation takes time. Further, because emissions of the internal combustion engine change greatly, there is a problem that the flow rate of NOx is difficult to calculate. There is another problem that even if the injection amount of ammonia is controlled based on the flow rate of NOx, the amount of nitrogen oxides and leakage of ammonia cannot be sufficiently decreased.

Further, even when the injection amount of urea is adjusted based on the concentration of nitrogen oxides or an ammonia concentration in treated flue gas, if ammonia remains in the treated flue gas, which is a detection target, ammonia may leak. Therefore, in an air pollution control device of the internal combustion engine, an oxidation catalyst for oxidizing ammonia is installed on a downstream side of NOx removal equipment such as a selective-catalytic-reduction catalytic device. However, there is a problem that nitrogen oxides are produced due to oxidization of ammonia. Further, if the leaked amount of ammonia is large, the size of the oxidation catalyst needs to be increased.

The present invention has been achieved to solve the above problems, and an object of the present invention is to provide a flue gas purifying device that calculates an appropriate amount of urea to be injected into an exhaust pipe so that ammonia hardly leaks to a downstream side, thereby efficiently decreasing nitrogen oxides in flue gas.

Solution to Problem

According to a aspect of the present invention, a flue gas purifying device that reduces nitrogen oxides contained in flue gas discharged from a burning appliance includes: an exhaust pipe that guides flue gas discharged from the burning appliance; a urea-water injecting unit that injects urea water into the exhaust pipe; a catalytic unit that includes a urea SCR catalyst that promotes a reaction between ammonia produced from injected urea water and the nitrogen oxides, and a support mechanism arranged inside of the exhaust pipe to support the urea SCR catalyst in the exhaust pipe, and that is arranged on a downstream side to a position where the urea water is injected in a flow direction of the flue gas; a first ammonia-concentration measuring unit that measures a concentration of ammonia in flue gas at a measurement position in a region where the catalytic unit is arranged; a second ammonia-concentration measuring unit arranged on a downstream side to the catalytic unit in a flow direction of the flue gas, to measure a concentration of ammonia in the flue gas having passed through the urea SCR catalyst; and a control unit that controls injection of urea water by the urea-water injecting unit based on measurement results acquired by the first and second ammonia-concentration measuring units.

As described above, by controlling injection of urea water performed by the urea-water injecting unit by the control unit based on the concentration of ammonia contained in flue gas in the middle of the urea SCR catalyst and ammonia contained in flue gas having passed through the urea SCR catalyst, nitrogen oxides in flue gas can be decreased, while further decreasing ammonia in flue gas discharged from the flue gas purifying device.

Advantageously, in the flue gas purifying device, the control unit sets a target concentration of the first ammonia-concentration measuring unit based on the measurement result acquired by the second ammonia-concentration measuring unit, and controls injection of urea water by the urea-water injecting unit so that the measurement result acquired by the first ammonia-concentration measuring unit becomes the target concentration of the first ammonia-concentration measuring unit. In this manner, by setting the target value of the ammonia concentration on an upstream side based on the ammonia concentration on a downstream side, nitrogen oxides in flue gas can be decreased, while further decreasing ammonia in flue gas discharged from the flue gas purifying device.

Advantageously, in the flue gas purifying device, the control unit controls injection of urea water by the urea-water injecting unit, such that, when it is assumed that a calculation basis of the target concentration at a measurement position of the first ammonia-concentration measuring unit is $C_1(NH_3)$, the target concentration at the measurement position of the first ammonia-concentration measuring unit is $C_1(NH_3)'$, the measurement result acquired by the second ammonia-concentration measuring unit is $C_2(t, NH_3)$, and the target concentration at a measurement position of the second ammonia-concentration measuring unit is $C_{20}(NH_3)$, $C_1(NH_3)$ is $C_1(NH_3)'=C_1(NH_3)/(C_2(t, NH_3)/C_{20}(NH_3)+0.5)$ and the measurement result acquired by the first ammonia-concentration measuring unit becomes $C_1(NH_3)'$.

By controlling injection of urea water using the above equation, nitrogen oxides in flue gas can be decreased, while further decreasing ammonia in flue gas discharged from the flue gas purifying device.

Advantageously, in the flue gas purifying device, the control unit controls injection of urea water by the urea-water injecting unit, such that, when it is assumed that a calculation basis of the target concentration at a measurement position of the first ammonia-concentration measuring unit is $C_1(NH_3)$, the target concentration at the measurement position of the first ammonia-concentration measuring unit is $C_1(NH_3)'$, the measurement result acquired by the second ammonia-concentration measuring unit is $C_2(t, NH_3)$, the target concentration at a measurement position of the second ammonia-concentration measuring unit is $C_{20}(NH_3)$, and an arbitrary constant is n, $C_1(NH_3)'$ is $C_1(NH_3)'=C_1(NH_3)-n\times(C_2(t, NH_3)-C_{20}(NH_3)\times 0.5)$ and the measurement result acquired by the first ammonia-concentration measuring unit becomes $C_1(NH_3)'$.

By controlling injection of urea water using the above equation, nitrogen oxides in flue gas can be decreased, while further decreasing ammonia in flue gas discharged from the flue gas purifying device.

Advantageously, in the flue gas purifying device, the control unit controls injection of urea water by the urea-water injecting unit, such that, when it is assumed that a calculation basis of the target concentration at a measurement position of the first ammonia-concentration measuring unit is $C_1(NH_3)$, the target concentration at the measurement position of the first ammonia-concentration measuring unit is $C_1(NH_3)'$, the measurement result acquired by the second ammonia-concentration measuring unit is $C_2(t, NH_3)$, the target concentration at a measurement position of the second ammonia-concentration measuring unit is $C_{20}(NH_3)$, an arbitrary cycle is T, and a time is t, $C_1(NH_3)'$ is $C_1(NH_3)'=C_1(NH_3)\times \sin(t/T)/(C_2(t, NH_3)/C_{20}(NH_3)+0.5)$ and the measurement result acquired by the first ammonia-concentration measuring unit becomes $C_1(NH_2)'$.

By controlling injection of urea water using the above equation, nitrogen oxides in flue gas can be decreased, while further decreasing ammonia in flue gas discharged from the flue gas purifying device. Further, by using $\sin(t/T)$, a state where the urea SCR catalyst adsorbs ammonia in a saturated state and a state where the urea SCR catalyst adsorbs ammonia in an unsaturated state can be repeated periodically, thereby enabling to enhance the capacity of the urea SCR catalyst as a catalyst.

Advantageously, the flue gas purifying device, further includes a pretreatment nitrogen-oxide-concentration measuring unit arranged on an upstream side to the catalytic unit in a flow direction of the flue gas to measure a concentration of nitrogen oxide in flue gas flowing into the catalytic unit. The control unit controls injection of urea water by the urea-water injecting unit, such that, when it is assumed that a calculation basis of the target concentration at a measurement position of the first ammonia-concentration measuring unit is $C_1(NH_3)$, the target concentration at the measurement position of the first ammonia-concentration measuring unit is $C_1(NH_3)'$, the measurement result acquired by the second ammonia-concentration measuring unit is $C_2(t, NH_3)$, the target concentration at a measurement position of the second ammonia-concentration measuring unit is $C_{20}(NH_3)$, a measurement result acquired by the pretreatment nitrogen-oxide-concentration measuring unit is $C_0(t, NOx)$, and a reference concentration at a measurement position of the pretreatment nitrogen-oxide-concentration measuring unit is $C_{00}(NOx)$, $C_1(NH_3)$ is $C_1(NH_3)'=C_1(NH_3)\times(C_0(t, NOx)/C_{00}(NOx))/C_2(t, NH_3)/C_{20}(NH_3)+0.5)$ and the measurement result acquired by the first ammonia-concentration measuring unit becomes $C_1(NH_3)'$.

By controlling injection of urea water using the above equation, nitrogen oxides in flue gas can be decreased, while further decreasing ammonia in flue gas discharged from the flue gas purifying device. Further, by controlling an injection amount based on the concentration of nitrogen oxides in flue gas flowing into the catalytic unit, control can be performed according to the concentration of nitrogen oxides in flue gas flowing into the catalytic unit.

Advantageously, the flue gas purifying device, further includes a post-treatment nitrogen-oxide-concentration measuring unit arranged on a downstream side to the catalytic unit in a flow direction of the flue gas to measure a concentration of nitrogen oxide in flue gas having passed through the urea SCR catalyst. The control unit controls injection of urea water by the urea-water injecting unit, such that, when it is assumed that a calculation basis of the target concentration at a measurement position of the first ammonia-concentration measuring unit is $C_1(NH_3)$, the target concentration at the measurement position of the first ammonia-concentration measuring unit is $C_1(NH_3)'$, the measurement result acquired by the second ammonia-concentration measuring unit is $C_2(t, NH_3)$, the target concentration at a measurement position of the second ammonia-concentration measuring unit is $C_{20}(NH_3)$, a measurement result acquired by the post-treatment nitrogen-oxide-concentration measuring unit is $C_2(t, NOx)$, and a reference concentration at a measurement position of the post-treatment nitrogen-oxide-concentration measuring unit is $C_{20}(NOx)$, $C_1(NH_3)'$ is $C_1(NH_3)'=C_1(NH_3)\times(C_2(t, NOx)/C_{20}(NOx))/C_2(t, NH_3)/C_{20}(NH_3)+0.5)$ and the measurement result acquired by the first ammonia-concentration measuring unit becomes $C_1(NH_3)'$.

By controlling injection of urea water using the above equation, nitrogen oxides in flue gas can be decreased, while further decreasing ammonia in flue gas discharged from the flue gas purifying device. Further, by controlling the injection amount based on the concentration of nitrogen oxides in flue gas discharged from the catalytic unit, control can be performed according to a remaining amount of the of nitrogen oxides.

Advantageously, the flue gas purifying device, further includes a pretreatment nitrogen-oxide-concentration measuring unit arranged on an upstream side to the catalytic unit in a flow direction of the flue gas to measure a concentration of nitrogen oxide in flue gas flowing into the catalytic unit, and a post-treatment nitrogen-oxide-concentration measuring unit arranged on a downstream side to the catalytic unit in a flow direction of the flue gas to measure a concentration of nitrogen oxides in flue gas having passed through the urea SCR catalyst. The control unit controls injection of urea water by the urea-water injecting unit, such that, when it is assumed that a calculation basis of the target concentration at a measurement position of the first ammonia-concentration measuring unit is $C_1(NH_3)$, the target concentration at the measurement position of the first ammonia-concentration measuring unit is $C_1(NH_3)'$, the measurement result acquired by the second ammonia-concentration measuring unit is $C_2(t, NH_3)$, the target concentration at a measurement position of the second ammonia-concentration measuring unit is $C_{20}(NH_3)$, a measurement result acquired by the pretreatment nitrogen-oxide-concentration measuring unit is $C_0(t, NOx)$, a measurement result acquired by the post-treatment nitrogen-oxide-concentration measuring unit is $C_2(t, NOx)$, and $(C_0(t, NOx)-C_2(t, NOx))/C_0(t, NOx)$ is $\eta$, $C_1(NH_3)'$ is $C_1(NH_3)'=C_1(NH_3)\times(1/\eta)/(C_2(t, NH_3)/C_{20}(NH_3)+0.5)$ and the measurement result acquired by the first ammonia-concentration measuring unit becomes $C_1(NH_3)'$.

By controlling injection of urea water using the above equation, nitrogen oxides in flue gas can be decreased, while further decreasing ammonia in flue gas discharged from the flue gas purifying device. Further, by controlling the injection amount based on a NOx removal efficiency $\eta$, control can be performed so that the NOx removal efficiency can be further increased.

It is desired that the second ammonia-concentration measuring unit measures the ammonia concentration in a region where the catalytic unit is arranged.

Because the second ammonia-concentration measuring unit also measures the ammonia concentration in a region where the catalytic unit is arranged, ammonia measured by the second ammonia-concentration measuring unit can be caused to react with nitrogen oxides by the catalytic unit on a downstream side to the second ammonia-concentration measuring unit. Accordingly, discharged ammonia can be further decreased.

Further, it is desired to include a restoring unit that performs restoration of the urea SCR catalyst, when the ammonia concentration measured by the second ammonia-concentration measuring unit and the concentration of nitrogen oxides measured by the post-treatment nitrogen-oxide-concentration measuring unit both exceed the reference concentration, respectively. It is also desired that the restoring unit heats the urea SCR catalyst at a predetermined temperature. It is also desired to include an isocyanic-acid-concentration measuring unit arranged between the urea-water injecting unit and the catalytic unit in a flow direction of flue gas, to measure the concentration of isocyanic acid in flue gas, and a temperature adjusting unit that adjusts the temperature of a flue-gas flow path between the urea-water injecting unit and the catalytic unit in the flow direction of the flue gas, so that the temperature adjusting unit adjusts the temperature of the flue-gas flow path based on the concentration of isocyanic acid measured by the isocyanic-acid-concentration measuring unit. Further, it is desired to include a pretreatment ammonia-concentration measuring unit arranged between the urea-water injecting unit and the catalytic unit in the flow direction of the flue gas to measure the concentration of ammonia in flue gas, and a temperature adjusting unit that adjusts the temperature of the flue-gas flow path between the urea-water injecting unit and the catalytic unit in the flow direction of the flue gas, so that the temperature adjusting unit adjusts the temperature of the flue-gas flow path based on the ammonia concentration measured by the pretreatment ammonia-concentration measuring unit.

Advantageous Effects of Invention

In the flue gas purifying device according to the present invention, the control unit controls injection of urea water performed by the urea-water injecting unit based on a concentration of ammonia contained in flue gas in the middle of the urea SCR catalyst and ammonia contained in flue gas having passed through the urea SCR catalyst. Accordingly, nitrogen oxides in flue gas can be decreased, while further decreasing ammonia in flue gas discharged from the flue gas purifying device.

DESCRIPTION OF EMBODIMENTS

Exemplary embodiments a flue gas purifying device according to the present invention will be explained below in detail with reference to the accompanying drawings. The present invention is not limited to the embodiments. In the following embodiments, it is assumed that an internal combustion engine mounted on the flue gas purifying device is a diesel engine, and a vehicle using the internal combustion engine is a vehicle having a diesel engine. However, the internal combustion engine is not limited thereto, and the present invention is also applicable to various internal combustion engines such as a gasoline engine and a gas turbine. Further, a device having the internal combustion engine is not limited to a vehicle, and the device can be used as an internal combustion engine of various devices such as a ship and a power generator. A burning appliance mounted on the flue gas purifying device is not limited to the internal combustion engine, and the flue gas purifying device can be also applicable to various burning appliances such as an incinerator, a pyrolytic furnace, a melting furnace, a boiler, and an external combustion engine. Waste can include various waste products. The present invention is also applicable to an incineration system that burns substances other than waste in an incinerator.

Figure 1:
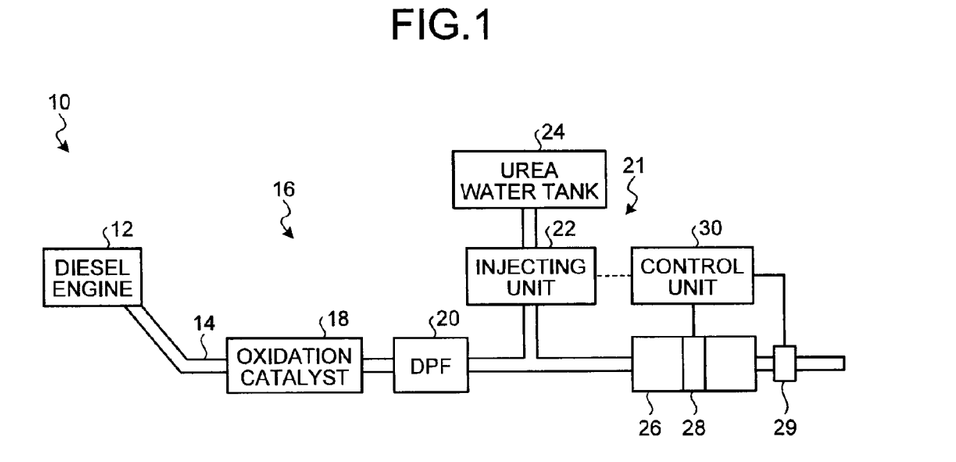
FIG. 1 is a block diagram of a schematic configuration of a vehicle according to an embodiment of the present invention having a flue gas purifying device according to the present invention.
Figure 2:
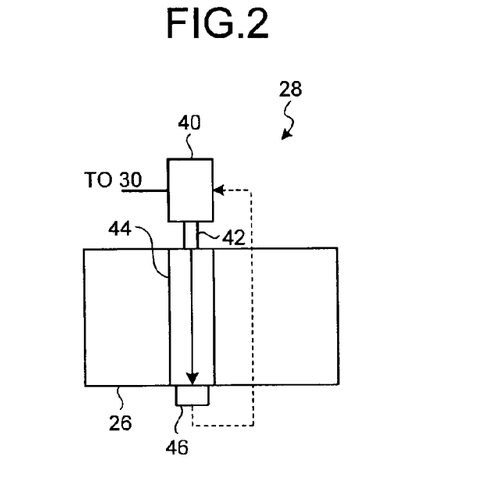
FIG. 2 is a block diagram of a schematic configuration of a concentration measuring unit in a flue gas purifying device for a diesel engine shown in FIG. 1.

FIG. 1 is a block diagram of a schematic configuration of a vehicle according to an embodiment having a diesel engine mounted on the flue gas purifying device according to the present invention. FIG. 2 is a block diagram of a schematic configuration of a concentration measuring unit in the flue gas purifying device shown in FIG. 1. As shown in FIG. 1, a vehicle 10 includes a diesel engine 12, an exhaust pipe 14 for guiding flue gas discharged from the diesel engine 12, and a flue gas purifying device 16 that purifies flue gas flowing in the exhaust pipe 14. The vehicle 10 also includes various elements required for a vehicle, such as wheels, a body, operating parts, and a transmission, other than constituent elements shown in the drawings.

The diesel engine 12 is an internal combustion engine that uses light oil or heavy oil as a fuel, and burns the fuel to extract power. The exhaust pipe 14 is connected to the diesel engine 12 at one end thereof, to guide flue gas discharged from the diesel engine 12.

The flue gas purifying device 16 includes an oxidation catalyst 18, a DPF 20, a urea SCR system 21, an injecting unit 22, a concentration measuring unit 28, a post-treatment ammonia-concentration measuring unit 29, and a control unit 30, and is arranged in an exhaust path of flue gas, that is, in the exhaust pipe 14 or adjacent to the exhaust pipe 14. As described later, the urea SCR system 21 includes a urea water tank 24 and a urea SCR catalytic unit 26.

The oxidation catalyst 18 is a catalyst such as platinum provided in the exhaust path of flue gas, specifically, inside of a downstream portion of an exhaust port of the diesel engine 12 in a flow direction of flue gas in the exhaust pipe 14. A part of particulate matters (PM) in flue gas having passed in the exhaust pipe 14 and through the oxidation catalyst 18 is removed by the oxidation catalyst 18. The PM here is an air contaminant discharged from the diesel engine, and is a mixture of solid carbon particles, unburned hydrocarbon (Soluble Organic Fraction: SOF) formed of polymeric molecules, and sulfate generated by oxidation of sulfur contained in the fuel. The oxidation catalyst 18 oxidizes nitrogen monoxide contained in flue gas flowing in the exhaust pipe 14 to nitrogen dioxide.

The DPF (Diesel Particulate Filter) 20 is a filter provided in the exhaust path of flue gas, specifically, inside of a downstream portion of the oxidation catalyst 18 in the exhaust pipe 14, to trap particulate matters contained in flue gas having passed through the oxidation catalyst 18. As the DPF 20, it is desired to use a continuous-regenerative DPF that can maintain the trapping performance such that regeneration is performed by removing trapped PM by burning or the like.

A urea SCR (Selective Catalytic Reduction) system 21 is an NOx removal system that reduces nitrogen oxides (NO, $NO_2$) contained in flue gas, and includes the injecting unit 22, the urea water tank 24, and the urea SCR catalytic unit 26. The injecting unit 22 is an injection device that injects urea water into the exhaust pipe 14, and an injection port is provided in a portion on a downstream side to the DPF 20 in the exhaust pipe 14. The injecting unit 22 injects urea water into the exhaust pipe 14 from the injection port. The urea water tank 24 stores urea water, and supplies urea water to the injecting unit 22. A replenishing port for replenishing urea water from an external device that supplies urea water is provided in the urea water tank 24, and urea water is replenished according to need from the replenishing port. The urea SCR catalytic unit 26 includes a urea SCR catalyst, which is a urea selective reduction catalyst that promotes a reaction between ammonia produced from urea with nitrogen oxides, and a support mechanism provided inside of a downstream portion of the injecting unit 22 in the exhaust pipe 14 to support the urea SCR catalyst. Zeolite catalyst can be used as the urea SCR catalyst. Further, the support mechanism is arranged inside the exhaust pipe 14, and a hole for aerating flue gas is formed therein, and the urea SCR catalyst is supported on the surface thereof.

The urea SCR system 21 has the configuration described above, and injects urea water into the exhaust pipe 14 by the injecting unit 22. The injected urea water becomes ammonia ($NH_3$) due to heat in the exhaust pipe 14. Specifically, ammonia is produced from urea water according to a chemical reaction as shown in the following equation.

$$(NH_2)2CO + H_2O \rightarrow 2NH_3 + CO_2$$

Thereafter, produced ammonia flows in the exhaust pipe 14 together with flue gas and reaches the urea SCR catalytic unit 26. A part of urea water is not used for producing ammonia and reaches the urea SCR catalytic unit 26 in the state of urea water. Therefore, even in the urea SCR catalytic unit 26, ammonia is produced from urea water according to the reaction mentioned above. Ammonia having reached the urea SCR catalytic unit 26 reacts with nitrogen oxides contained in flue gas to remove oxygen from nitrogen oxides and is reduced to nitrogen. Specifically, nitrogen oxides are reduced according to the following chemical reaction.

$$4NH_3 + 4NO + O_2 \rightarrow 4N_2 + 6H_2O$$

$$4NH_3 + 2NO_2 + O_2 \rightarrow 3N_2 + 6H_2O$$

The concentration measuring unit 28 is arranged in the urea SCR catalytic unit 26 in the exhaust path of flue gas, that is, in such a manner that an upstream face and a downstream face are both in contact with the urea SCR catalytic unit 26, to measure the ammonia concentration in flue gas flowing in the urea SCR catalytic unit 26. As shown in FIG. 2, the concentration measuring unit 28 includes a measuring unit body 40, an optical fiber 42, a measuring cell 44, and a light receiving unit 46.

The measuring unit body 40 has a light emitting unit that emits laser beams in a wavelength region absorbed by ammonia, and a computing unit that calculates the ammonia concentration from a signal. The measuring unit body 40 outputs laser beams to the optical fiber 42 and receives a signal received by the light receiving unit 46.

The optical fiber 42 guides laser beams output from the measuring unit body 40 so as to enter into the measuring cell 44.

The measuring cell 44 is arranged in a part of the exhaust pipe 14, and includes an incident unit that causes light emitted from the optical fiber 42 to enter into the measuring cell 44, and an output unit that outputs laser beams having passed through a predetermined route in the measuring cell 44.

The light receiving unit 46 receives laser beams having passed through the inside of the measuring cell 44 and output from the output unit, and outputs an intensity of received laser beams to the measuring unit body 40 as a light receiving signal.

The concentration measuring unit 28 has the configuration described above, and laser beams output from the measuring unit body 40 pass through the predetermined route in the measuring cell 44 from the optical fiber 42 and is output from the output unit. At this time, if ammonia is contained in flue gas in the measuring cell 44, laser beams passing through the measuring cell 44 are absorbed. Therefore, an output of laser beams reaching the output unit changes according to the ammonia concentration in flue gas. The light receiving unit 46 converts laser beams output from the output unit to a light receiving signal, and outputs the light receiving signal to the measuring unit body 40. The measuring unit body 40 compares the intensity of output laser beams with an intensity calculated from the light receiving signal, to calculate the ammonia concentration in flue gas flowing in the measuring cell 44 based on its rate of diminution. Thus, the concentration measuring unit 28 uses TDLAS (Tunable Diode Laser Absorption Spectroscopy) to calculate and/or measure the ammonia concentration in flue gas passing through a predetermined position in the measuring cell 44, that is, a measurement position based on the intensity of output laser beams and the light receiving signal detected by the light receiving unit 46. The concentration measuring unit 28 according to the present embodiment can continuously calculate or measure the ammonia concentration.

Only the incident unit and the output unit of the measuring cell 44 can be made of a light transmitting material, or the measuring cell 44 on the whole can be made of the light transmitting material. Further, at least two optical mirrors can be provided in the measuring cell 44, so that laser beams entering from the incident unit is multiply-reflected by the optical mirrors and output from the output unit. By multiply-reflecting laser beams, laser beams can pass through more regions in the measuring cell 44. Accordingly, an influence of concentration distribution on flue gas flowing in the measuring cell 44 can be decreased, thereby enabling accurate detection of concentrations.

The post-treatment ammonia-concentration measuring unit 29 is arranged in the exhaust pipe 14 on the downstream side of the urea SCR catalytic unit 26 in the exhaust path of flue gas, to measure the concentration of ammonia in flue gas having passed through the urea SCR catalytic unit 26. The post-treatment ammonia-concentration measuring unit 29 is a measuring unit same as the concentration measuring unit 28, and continuously measures the ammonia concentration according to the same method as that of the concentration measuring unit 28.

The control unit 30 controls the amount of urea water to be injected from the injecting unit 22 and injection timing according to PID control based on detection results acquired by the concentration measuring unit 28 and the post-treatment ammonia-concentration measuring unit 29. An example of a control method is explained below.

An initial target concentration $C_{10}(NH_3)$ of an ammonia concentration at a measurement position of the concentration measuring unit 28 and a target concentration $C_{20}(NH_3)$ of an ammonia concentration at a measurement position of the post-treatment ammonia-concentration measuring unit 29 are set as initial values. The initial target concentration $C_{10}(NH_3)$ and the target concentration $C_{20}(NH_3)$ are preset values, and are stored in a storage unit of the control unit 30. The initial target concentration $C_{10}(NH_3)$ is the ammonia concentration capable of causing a reaction between ammonia and nitrogen oxides by the urea SCR catalytic unit 26 in a portion on a downstream side to the concentration measuring unit 28.

When the diesel engine 12 is driven and flue gas is discharged from the diesel engine 12, the control unit 30 starts control of the injecting unit 22. The control unit 30 acquires an ammonia concentration $C_1(t, NH_3)$ measured by the concentration measuring unit 28 and an ammonia concentration $C_2(t, NH_3)$ measured by the post-treatment ammonia-concentration measuring unit 29.

The control unit 30 calculates a new target concentration $C_1(NH_3)'$ based on the set target concentration of the ammonia concentration and the ammonia concentration $C_2(t, NH_3)$. Specifically, the control unit 30 calculates the new target concentration $C_1(NH_3)'$ by assigning respective values into $C_1(NH_3)'=C_1(NH_3)/C_2(t, NH_3)/C_{20}(NH_3)+0.5)$ ... (Equation 1). In a calculation at the time of startup, the initial target concentration $C_{10}(NH_3)$ is assigned as the target concentration $C_1(NH_3)$, and the target concentration $C_1(NH_3)'$ calculated by the calculation immediately before is assigned as $C_1(NH_3)$ from the next calculation. That is, the target concentration $C_1(NH_3)$ is updated for each calculation. The target concentration $C_{20}(NH_3)$ is not updated from the initially set ammonia concentration.

Next, the control unit 30 calculates an injection amount of urea water based on the calculated target concentration $C_1(NH_3)'$ and the measured ammonia concentration $C_1(t, NH_3)$. Specifically, when $C_1(NH_3)'>C_1(t, NH_3)$, the control unit 30 increases an amount of urea water to be injected or decreases an injection interval of urea water. When $C_1(NH_3)'<C_1(t, NH_3)$, the control unit 30 decreases the amount of urea water to be injected or increases the injection interval of urea water. When $C_1(NH_3)'=C_1(t, NH_3)$, the control unit 30 maintains the amount of urea water to be injected and the injection interval of urea water as is. While the diesel engine 12 is being driven and flue gas is being discharged from the diesel engine 12, the control unit 30 repeats the processing described above to update the target concentration $C_1(NH_3)'$, and controls the operation of the injecting unit 22 so that the measured ammonia concentration $C_1(t, NH_3)$ becomes the target concentration $C_1(NH_3)'$.

The vehicle 10 and the flue gas purifying device 16 have basically the configuration as described above. The flue gas purifying device 16 traps PM contained in flue gas to decrease the PM in flue gas, by causing flue gas discharged from the diesel engine 12 to pass through the oxidation catalyst 18 and the DPF 20. Flue gas having passed through the DPF 20 flows in the exhaust pipe 14, and after urea water is injected from the injecting unit 22, flue gas passes through the urea SCR catalytic unit 26 together with urea water and ammonia produced from urea water. Because flue gas passes through the urea SCR catalytic unit 26 together with ammonia, nitrogen oxides contained in flue gas are decreased by the urea SCR system 21. Thereafter, flue gas is discharged to the atmosphere from the exhaust pipe 14. As described above, the control unit 30 in the flue gas purifying device 16 controls the amount of urea water injected by the injecting unit 22 and the injection timing based on the ammonia concentration $C_1(t, NH_3)$ measured by the concentration measuring unit 28 and the ammonia concentration $C_2(t, NH_3)$ measured by the post-treatment ammonia-concentration measuring unit 29.

For example, it is assumed here that the initial target concentration $C_{10}(NH_3)=100$ ppm and the target concentration $C_{20}(NH_3)=5$ ppm. It is also assumed that the urea SCR catalytic unit 26 has a catalytic power sufficient for causing a reaction between ammonia having an ammonia concentration of 100 ppm and nitrogen oxides in a portion on a downstream side to the concentration measuring unit 28. At this time, when the measured ammonia concentration $C_2(t, NH_3)$ is 0 ppm, the target concentration $C_1(NH_3)'$ becomes 200 ppm. When the measured ammonia concentration $C_2(t, NH_3)$ is 2.5 ppm, the target concentration $C_1(NH_3)'$ becomes 100 ppm. When the measured ammonia concentration $C_2(t, NH_3)$ is 5 ppm, the target concentration $C_1(NH_3)'$ becomes 67 ppm.

When the measured ammonia concentration $C_2(t, NH_3)$ is 10 ppm, the target concentration $C_1(NH_3)'$ becomes 40 ppm. When the measured ammonia concentration $C_2(t, NH_3)$ is 25 ppm, the target concentration $C_1(NH_3)'$ becomes 18 ppm. In this case, the control unit 30 can control the operation of the injecting unit 22 in a state where the ammonia concentration $C_2(t, NH_3)$ eventually becomes about 2.5 ppm, which is half the target concentration $C_{20}(NH_3)$.

As described above, the vehicle 10 can decrease the PM in flue gas discharged from the diesel engine 12, reduce nitrogen oxides, and discharge flue gas in a state with harmful substances being decreased, by the flue gas purifying device 16.

Further, the flue gas purifying device 16 measures the ammonia concentration in the middle of the urea SCR catalytic unit 26 and the ammonia concentration having passed through the urea SCR catalytic unit 26. In this manner, by controlling the injection amount of urea water according to the result thereof, the injection amount of urea water can be controlled according to the reaction state between ammonia and nitrogen oxides.

Further, the flue gas purifying device 16 sets a target concentration of an ammonia concentration on a further upstream side based on a measurement value of a concentration measuring device located on a further downstream side in a flow direction of flue gas, and compares the target value with the measurement value to control the operation of the injecting unit 22 so as to achieve the target concentration, thereby enabling to suppress that the concentration on the downstream side largely fluctuates and decrease nitrogen oxides, while suppressing ammonia leakage. Because the control can be favorably performed even if the target concentration at a measurement position on the downstream side is low, the ammonia concentration as the target concentration can be decreased, and the leaked amount of ammonia can be decreased.

The flue gas purifying device 16 can suppress leakage of ammonia as described above. However, it is desired to provide an oxidation catalyst that oxidizes ammonia on a downstream side to the urea SCR catalytic unit 26, in order to further decrease ammonia leaking into the atmosphere. Even if the oxidation catalyst is provided, the oxidation catalyst can be made smaller than the conventional one, because the flue gas purifying device 16 can decrease the leaked amount of ammonia. Accordingly, the device configuration of the flue gas purifying device can be further simplified, and the weight thereof can be decreased. Further, nitrogen oxides generated due to oxidation of ammonia can be decreased.

By using zeolitic metal as the urea SCR catalyst, the urea SCR catalyst can function appropriately as a catalyst even under a high-temperature condition discharged from the internal combustion engine or the like. Ammonia adsorption on zeolite is large and changes according to the temperature. Therefore, control by using a map or the like is difficult. However, as in the present invention, by measuring the concentration of ammonia in flue gas having passed through the urea SCR catalytic unit 26, and controlling the injection amount of urea water based on the measurement result, leakage of ammonia can be suppressed even if zeolitic metal is used as the urea SCR catalyst.

In the flue gas purifying device 16, PM is trapped by the oxidation catalyst 18 and the DPF 20, to decrease the PM in flue gas; however, the present invention is not limited thereto. Various types of particulate-matter decreasing devices that decrease the PM can be used for the flue gas purifying device, and for example, only a filter for trapping the PM can be arranged without providing the oxidation catalyst.

In the flue gas purifying device 16, the concentration measuring unit 28 can measure ammonia continuously without detecting nitrogen oxides. Therefore, the concentration measuring unit 28 uses the TDLAS method in which laser beams in a wavelength region absorbed by ammonia are output and an absorption rate of laser beams is detected, to measure the ammonia concentration. However, the present invention is not limited thereto. Various measuring units that can measure the concentration of ammonia in flue gas can be also used in the present invention. For example, a branch pipe can be provided at the measurement position, so that a part of flue gas is caused to flow into the branch pipe to measure the concentration of ammonia in flue gas flowing in the branch pipe.

The calculation method of the target concentration $C_1(NH_3)'$ by the control unit 30 is not limited to the Equation 1 mentioned above. The control unit 30 can calculate the target concentration $C_1(NH_3)'$ by using, for example, $C_1(NH_3)'=C_1(NH_3)-n\times(C_2(t, NH_3)-C_{20}(NH_3)\times 0.5)$ ... (Equation 2), where n is a settable arbitrary constant, and when $C_1(NH_3)'$ takes a negative value, it is set that $C_1(NH_3)'=0$.

When the control unit 30 calculates the target concentration $C_1(NH_3)'$ according to the Equation 2, when it is assumed that the initial target concentration $C_{10}(NH_3)=100$ ppm, the target concentration $C_{20}(NH_3)=5$ ppm, and n=20, when the measured ammonia concentration $C_2(t, NH_3)$ is 0 ppm, the target concentration $C_1(NH_3)'$ becomes 150 ppm. When the measured ammonia concentration $C_2(t, NH_3)$ is 2.5 ppm, the target concentration $C_1(NH_3)'$ becomes 100 ppm. When the measured ammonia concentration $C_2(t, NH_3)$ is 5 ppm, the target concentration $C_1(NH_3)'$ becomes 50 ppm. Further, when the measured ammonia concentration $C_2(t, NH_3)$ is equal to or higher than 7.5 ppm, the target concentration $C_1(NH_3)'$ becomes 0 ppm. Also in this case, the control unit 30 can control the operation of the injecting unit 22 in a state where the ammonia concentration $C_2(t, NH_3)$ eventually becomes about 2.5 ppm, which is half the target concentration $C_{20}(NH_3)$. In this manner, the operation of the injecting unit 22 can be favorably controlled by calculating the target concentration $C_1(NH_3)'$ by using the Equation 2, and nitrogen oxides can be decreased, while suppressing leakage of ammonia.

Further, the control unit 30 can calculate the target concentration $C_1(NH_3)'$ by using $C_1(NH_3)'=C_1(NH_3)\times\sin(t/T)/(C_2(t, NH_3)/C_{20}(NH_3)+0.5)$ ... (Equation 3). T is a settable arbitrary cycle.

When the control unit 30 calculates the target concentration $C_1(NH_3)'$, when it is assumed that the initial target concentration $C_{10}(NH_3)=100$ ppm, the target concentration $C_{20}(NH_3)=5$ ppm, and $\sin(t/T)=1$, when the measured ammonia concentration $C_2(t, NH_3)$ is 0 ppm, the target concentration $C_1(NH_3)'$ becomes 200 ppm. When the measured ammonia concentration $C_2(t, NH_3)$ is 2.5 ppm, the target concentration $C_1(NH_3)'$ becomes 100 ppm. When the measured ammonia concentration $C_2(t, NH_3)$ is 5 ppm, the target concentration $C_1(NH_3)'$ becomes 67 ppm. When the measured ammonia concentration $C_2(t, NH_3)$ is 10 ppm, the target concentration $C_1(NH_3)'$ becomes 40 ppm. When the measured ammonia concentration $C_2(t, NH_3)$ is 25 ppm, the target concentration $C_1(NH_3)'$ becomes 18 ppm.

Also in this case, the control unit 30 can control the operation of the injecting unit 22 in a state where the ammonia concentration $C_2(t, NH_3)$ eventually becomes about 2.5 ppm, which is half the target concentration $C_{20}(NH_3)$. In this manner, the operation of the injecting unit 22 can be favorably controlled by calculating the target concentration $C_1(NH_3)'$ by using the Equation 3, and nitrogen oxides can be decreased, while suppressing leakage of ammonia.

Further, when the Equation 3 is used, the target concentration $C_1(NH_3)'$ can be changed periodically, because $\sin(t/T)$ changes periodically due to t. Accordingly, a state where the urea SCR catalyst in the urea SCR catalytic unit 26 adsorbs ammonia in a saturated state and a state where the urea SCR catalyst adsorbs ammonia in an unsaturated state can be changed periodically. That is, the urea SCR catalyst can be periodically changed over between a state where the urea SCR catalyst cannot adsorb ammonia any more and a state where the urea SCR catalyst can still adsorb ammonia. The NOx removal efficiency increases when the urea SCR catalyst changes the state from the saturated state to the unsaturated state. Therefore, by periodically repeating the saturated state and the unsaturated state, ammonia can efficiently reduce nitrogen oxides.

Figure 3:
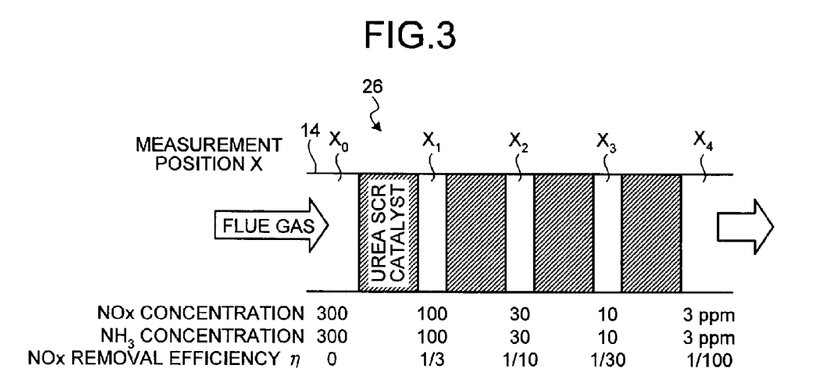
FIG. 3 is a schematic sectional view of a urea SCR catalytic unit.

In the control examples described above, the initial target concentration $C_{10}(NH_3)$ is set to 100 ppm. However, the value can be set based on the catalytic power of the urea SCR catalyst and an arranged position of the concentration measuring unit 28. An example is explained with reference to FIG. 3. FIG. 3 is a schematic sectional view of the urea SCR catalytic unit. In the urea SCR catalytic unit 26 shown in FIG. 3, a position $X_0$ becomes an inlet of the urea SCR catalytic unit 26, and a position $X_4$ becomes an outlet of the urea SCR catalytic unit 26. It is assumed here that there are positions where the concentration measuring unit 28 can be arranged at three positions of a position $X_1$, a position $X_2$, and a position $X_3$ in this order from an upstream side in a flow direction of the flue gas, in the region where the urea SCR catalytic unit 26 is arranged. In the urea SCR catalytic unit 26 shown in FIG. 3, it is shown that there is a gap in the urea SCR catalyst at the positions $X_1$, $X_2$, and $X_3$; however, the gap is not essential. However, when a measurement position is set, a region for arranging the concentration measuring unit 28 is required. In the urea SCR catalytic unit 26 shown in FIG. 3, when flue gas having a concentration of nitrogen monoxide of 300 ppm and an ammonia concentration of 300 ppm is supplied, the ammonia concentration becomes 100 ppm at the position $X_1$, 30 ppm at the position $X_2$, and 10 ppm at the position $X_3$. Further, the ammonia concentration becomes 3 ppm at the position $X_4$. That is, the ammonia concentration at the time of being discharged from the concentration measuring unit 28 is 3 ppm.

In this case, when the concentration measuring unit 28 is arranged at the position $X_1$, as described above, the initial target concentration $C_{10}(NH_3)$ can be set to 100 ppm. When the concentration measuring unit 28 is arranged at the position $X_2$, the initial target concentration $C_{10}(NH_3)$ can be set to 30 ppm. When the concentration measuring unit 28 is arranged at the position $X_3$, the initial target concentration $C_{10}(NH_3)$ can be set to 10 ppm. By setting the initial target concentration in this manner, the operation of the injecting unit 22 can be favorably controlled, regardless of the arrangement position of the concentration measuring unit 28.

It is desired that the concentration measuring unit 28 detects the concentration of ammonia in flue gas at a position included in a region of from a position where the concentration of nitrogen oxides at the time of maximum load of the diesel engine, when nitrogen oxides in flue gas are reduced in a state with ammonia being input excessively into the urea SCR catalyst, becomes either a concentration at an inlet of the urea SCR catalyst at the time of minimum load of the diesel engine or a concentration half the concentration at the inlet of the urea SCR catalyst at the time of maximum load of the internal combustion engine, whichever the higher, to a position where the concentration of nitrogen oxides at the time of maximum load of the diesel engine becomes a theoretical concentration of nitrogen oxides that can be denitrated with an ammonia concentration of 10 ppm, of a region of the urea SCR catalytic unit 26 in which the urea SCR catalyst is arranged, in a flow direction of the flue gas. By arranging the concentration measuring unit 28 in the above range, nitrogen oxides in a certain amount or more react with ammonia due to the urea SCR catalyst, and the ammonia concentration at a position where a certain amount of ammonia remains can be measured. Accordingly, control can be performed based on a high ammonia concentration to a certain extent, while ascertaining the current catalytic power of the urea SCR catalyst, thereby enabling to decrease leaked amount of ammonia and further decrease nitrogen oxides.

Further, in the flue gas purifying device 16, the concentration measuring unit 28 and the post-treatment ammonia-concentration measuring unit 29 are provided to control the operation of the urea SCR catalytic unit 26. However, the present invention is not limited thereto. Another embodiment of the flue gas purifying device according to the present invention is explained with reference to FIG. 4.

Figure 4:
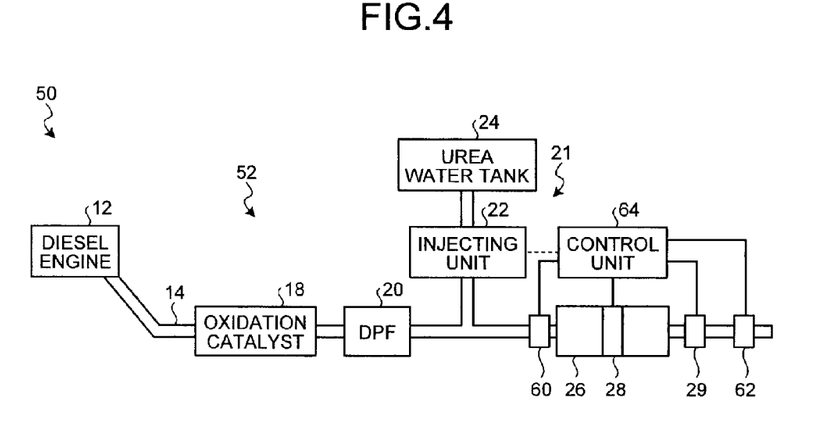
FIG. 4 is a block diagram of a schematic configuration of a vehicle according to another embodiment having the flue gas purifying device.

FIG. 4 is a block diagram of a schematic configuration of a vehicle according to another embodiment having the flue gas purifying device. A vehicle 50 shown in FIG. 4 has the same configuration as that of the vehicle 10, except of a part of a flue gas purifying device 52, and therefore explanations of like constituent elements will be omitted, and features specific to the vehicle 50 are mainly explained below. The vehicle 50 shown in FIG. 4 includes the diesel engine 12, the exhaust pipe 14, and the flue gas purifying device 52. The flue gas purifying device 52 includes the oxidation catalyst 18, the DPF 20, the urea SCR catalytic unit 21, the concentration measuring unit 28, the post-treatment ammonia-concentration measuring unit 29, a pretreatment nitrogen-oxide-concentration measuring unit 60, a post-treatment nitrogen-oxide-concentration measuring unit 62, and a control unit 64. The urea SCR system 21 includes the injecting unit 22, the urea water tank 24, and the urea SCR catalytic unit 26. The oxidation catalyst 18, the DPF 20, the urea SCR catalytic system 21 including the injecting unit 22, the urea water tank 24, and the urea SCR catalytic unit 26, the concentration measuring unit 28, and the post-treatment ammonia-concentration measuring unit 29 respectively have the same configuration as those of the flue gas purifying device 16 described above, and thus detailed explanations thereof will be omitted.

The pretreatment nitrogen-oxide-concentration measuring unit 60 is arranged on an upstream side of the urea SCR catalytic unit 26, in an exhaust path of flue gas, to measure the concentration of nitrogen oxides in flue gas supplied to the urea SCR catalytic unit 26. A sensor having the same configuration as that of the concentration measuring unit 28 can be used as the pretreatment nitrogen-oxide-concentration measuring unit 60. Specifically, the pretreatment nitrogen-oxide-concentration measuring unit 60 causes a light emitting unit to emit laser beams in a wavelength region absorbed by nitrogen oxides, and receives light emitted from the light emitting unit and having passed in flue gas by a light receiving unit, thereby enabling to detect the concentration of nitrogen oxides in flue gas based on the intensity of received light. The pretreatment nitrogen-oxide-concentration measuring unit 60 continuously measures the concentration of nitrogen oxides contained in flue gas before passing through the urea SCR catalytic unit 26, and transmits a measurement result to the control unit 64. Various sensors such as a sensor that detects only nitrogen oxides without detecting isocyanic acid and ammonia in flue gas and measures the concentration of nitrogen oxides can be used as the nitrogen-oxide-concentration measuring unit.

The post-treatment nitrogen-oxide-concentration measuring unit 62 is arranged in the exhaust pipe 14 on the downstream side of the urea SCR catalytic unit 26 in the exhaust path of flue gas, to measure the concentration of nitrogen oxides in flue gas having passed through the urea SCR catalytic unit 26. A sensor having the same configuration as that of the pretreatment nitrogen-oxide-concentration measuring unit 60 can be used as the post-treatment nitrogen-oxide-concentration measuring unit 62. The post-treatment nitrogen-oxide-concentration measuring unit 62 continuously measures the concentration of nitrogen oxides contained in flue gas having passed through the urea SCR catalytic unit 26 and transmits a measurement result to the control unit 64.

The pretreatment nitrogen-oxide-concentration measuring unit 60 and the post-treatment nitrogen-oxide-concentration measuring unit 62 can detect only nitrogen monoxide or only nitrogen dioxide, or can detect both of nitrogen monoxide and nitrogen dioxide as nitrogen oxides. The concentration of nitrogen oxides in flue gas can be favorably measured and a measurement value can be used for calculating the injection amount of urea water, by detecting only nitrogen monoxide or only nitrogen dioxide, or both of nitrogen monoxide and nitrogen dioxide. It is desired here that the pretreatment nitrogen-oxide-concentration measuring unit 60 and the post-treatment nitrogen-oxide-concentration measuring unit 62 detect only nitrogen monoxide.

The control unit 64 controls the operation of the injecting unit 22 based on the measurement results transmitted from the concentration measuring unit 28, the post-treatment ammonia-concentration measuring unit 29, the pretreatment nitrogen-oxide-concentration measuring unit 60, and the post-treatment nitrogen-oxide-concentration measuring unit 62.

An example of the operation of the injecting unit 22 performed by the control unit 64 is explained next. Other operations performed by the control unit 64 except of the calculation method of the target concentration $C_1(NH_3)'$, that is, the method of comparing the target concentration with the measured ammonia concentration and controlling the injection timing and the injection amount of urea water according to a comparison result are the same as those in the control unit 30. Therefore, the calculation method of the target concentration $C_1(NH_3)'$ is explained below.

A case that the measurement results acquired by the concentration measuring unit 28, the post-treatment ammonia-concentration measuring unit 29, and the pretreatment nitrogen-oxide-concentration measuring unit 60 are used is explained first. In this case, a reference concentration $C_{00}(NOx)$ of the concentration of nitrogen oxides at a measurement position of the pretreatment nitrogen-oxide-concentration measuring unit 60 is set as an initial value, in addition to the initial target concentration $C_{10}(NH_3)$ and the target concentration $C_{20}(NH_3)$.

When the diesel engine 12 is driven and flue gas is discharged from the diesel engine 12, the control unit 64 starts control of the injecting unit 22. The control unit 64 acquires the ammonia concentration $C_1(t, NH_3)$ measured by the concentration measuring unit 28, the ammonia concentration $C_2(t, NH_3)$ measured by the post-treatment ammonia-concentration measuring unit 29, and a nitrogen oxide concentration $C_0(t, NOx)$ measured by the pretreatment nitrogen-oxide-concentration measuring unit 60.

Next, the control unit 64 calculates the new target concentration $C_1(NH_3)'$ based on the set target concentration of the ammonia concentration, the reference concentration of the concentration of nitrogen oxides, the ammonia concentration $C_2(t, NH_3)$, and the nitrogen oxide concentration $C_0(t, NOx)$. Specifically, the control unit 64 calculates the new target concentration $C_1(NH_3)'$ by assigning respective values into $C_1(NH_3)'=C_1(NH_3)\times(C_0(t, NOx)/C_{00}(NOx))/C_2(t, NH_3)/C_{20}(NH_3)+0.5)$ ... (Equation 4).

When the control unit 64 calculates the target concentration $C_1(NH_3)'$ according to the Equation 4, when it is assumed that the initial target concentration $C_{10}(NH_3)=100$ ppm, the target concentration $C_{20}(NH_3)=5$ ppm, and $(C_0(t, NOx)/C_{00}(NOx))=1$, when the measured ammonia concentration $C_2(t, NH_3)$ is 0 ppm, the target concentration $C_1(NH_3)'$ becomes 200 ppm. When the measured ammonia concentration $C_2(t, NH_3)$ is 2.5 ppm, the target concentration $C_1(NH_3)'$ becomes 100 ppm. When the measured ammonia concentration $C_2(t, NH_3)$ is 5 ppm, the target concentration $C_1(NH_3)'$ becomes 67 ppm. When the measured ammonia concentration $C_2(t, NH_3)$ is 10 ppm, the target concentration $C_1(NH_3)'$ becomes 40 ppm. When the measured ammonia concentration $C_2(t, NH_3)$ is 25 ppm, the target concentration $C_1(NH_3)'$ becomes 18 ppm.

Also in this case, the control unit 64 can control the operation of the injecting unit 22 in a state where the ammonia concentration $C_2(t, NH_3)$ eventually becomes about 2.5 ppm, which is half the target concentration $C_{20}(NH_3)$. In this manner, the operation of the injecting unit 22 can be favorably controlled by calculating the target concentration $C_1(NH_3)'$ by using the Equation 4, and nitrogen oxides can be decreased, while suppressing leakage of ammonia.

Further, when the Equation 4 is used, the target concentration $C_1(NH_3)'$ can be corrected according to the nitrogen oxide concentration $C_0(t, NOx)$ measured by the pretreatment nitrogen-oxide-concentration measuring unit 60. That is, when the concentration of nitrogen oxides is high, the target concentration can be increased, and when the concentration of nitrogen oxides is low, the target concentration can be decreased. Accordingly, the operation of the injecting unit 22 can be controlled according to the concentration of nitrogen oxides to be fed to the urea SCR catalytic unit 26 and purified (reduced). For example, when the reference concentration $C_{00}(NOx)$ of the concentration of nitrogen oxides is set to 300 ppm, and the measured nitrogen oxide concentration $C_0(t, NOx)$ is 350 ppm, the target concentration $C_1(NH_3)'$ is calculated at about 1.17 times the concentration when the measured concentration is the reference concentration. Accordingly, more urea water can be injected, and nitrogen oxides discharged in an amount larger than a reference amount can be appropriately reduced.

A case that the measurement results acquired by the concentration measuring unit 28, the post-treatment ammonia-concentration measuring unit 29, and the post-treatment nitrogen-oxide-concentration measuring unit 62 are used is explained next. In this case, a reference concentration $C_{20}(NOx)$ of the concentration of nitrogen oxides at a measurement position of the post-treatment nitrogen-oxide-concentration measuring unit 62 is set as an initial value, in addition to the initial target concentration $C_{10}(NH_3)$ and the target concentration $C_{20}(NH_3)$.

When the diesel engine 12 is driven and flue gas is discharged from the diesel engine 12, the control unit 64 starts control of the injecting unit 22. The control unit 64 acquires the ammonia concentration $C_1(t, NH_3)$ measured by the concentration measuring unit 28, the ammonia concentration $C_2(t, NH_3)$ measured by the post-treatment ammonia-concentration measuring unit 29, and the nitrogen oxide concentration $C_2(t, NOx)$ measured by the post-treatment nitrogen-oxide-concentration measuring unit 62.

The control unit 64 calculates the new target concentration $C_1(NH_3)'$ based on the set target concentration of the ammonia concentration, the reference concentration of the concentration of nitrogen oxides, the ammonia concentration $C_2(t, NH_3)$, and the nitrogen oxide concentration $C_2(t, NOx)$. Specifically, the control unit 64 calculates the new target concentration $C_1(NH_3)'$ by assigning respective values into $C_1(NH_3)'=C_1(NH_3)\times(C_2(t, NOx)/C_{20}(NOx))/C_2(t, NH_3)/C_{20}(NH_3)+0.5)$ ... (Equation 5).

When the control unit 64 calculates the target concentration $C_1(NH_3)'$ according to the Equation 5, when it is assumed that the initial target concentration $C_{10}(NH_3)=100$ ppm, the target concentration $C_{20}(NH_3)=5$ ppm, and $(C_2(t, NOx)/C_{20}(NOx))=1$, when the measured ammonia concentration $C_2(t, NH_3)$ is 0 ppm, the target concentration $C_1(NH_3)'$ becomes 200 ppm. When the measured ammonia concentration $C_2(t, NH_3)$ is 2.5 ppm, the target concentration $C_1(NH_3)'$ becomes 100 ppm. When the measured ammonia concentration $C_2(t, NH_3)$ is 5 ppm, the target concentration $C_1(NH_3)'$ becomes 67 ppm. When the measured ammonia concentration $C_2(t, NH_3)$ is 10 ppm, the target concentration $C_1(NH_3)'$ becomes 40 ppm. When the measured ammonia concentration $C_2(t, NH_3)$ is 25 ppm, the target concentration $C_1(NH_3)'$ becomes 18 ppm.

Also in this case, the control unit 64 can control the operation of the injecting unit 22 in a state where the ammonia concentration $C_2(t, NH_3)$ eventually becomes about 2.5 ppm, which is half the target concentration $C_{20}(NH_3)$. In this manner, the operation of the injecting unit 22 can be favorably controlled by calculating the target concentration $C_1(NH_3)'$ by using the Equation 5, and nitrogen oxides can be decreased, while suppressing leakage of ammonia.

Further, when the Equation 5 is used, the target concentration $C_1(NH_3)'$ can be corrected according to the nitrogen oxide concentration $C_2(t, NOx)$ measured by the post-treatment nitrogen-oxide-concentration measuring unit 62. That is, when the measured concentration of nitrogen oxides is high, the target concentration can be increased, and when the concentration of nitrogen oxides is low, the target concentration can be decreased. Accordingly, the operation of the injecting unit 22 can be controlled according to the concentration of nitrogen oxides in flue gas discharged from the urea SCR catalytic unit 26. For example, when the reference concentration $C_{20}(NOx)$ of the concentration of nitrogen oxides is set to 10 ppm, and the measured nitrogen oxide concentration $C_2(t, NOx)$ is 20 ppm, the target concentration $C_1(NH_3)'$ is calculated at about two times the concentration when the measured concentration is the reference concentration. Accordingly, more urea water can be injected, and nitrogen oxides remaining in an amount larger than a reference amount can be appropriately reduced.

A case that the measurement results acquired by the concentration measuring unit 28, the post-treatment ammonia-concentration measuring unit 29, the pretreatment nitrogen-oxide-concentration measuring unit 60, and the post-treatment nitrogen-oxide-concentration measuring unit 62 are used is explained next. In this case, the initial target concentration $C_{10}(NH_3)$ and the target concentration $C_{20}(NH_3)$ are set as the initial values.

When the diesel engine 12 is driven and flue gas is discharged from the diesel engine 12, the control unit 64 starts control of the injecting unit 22. The control unit 64 acquires the ammonia concentration $C_1(t, NH_3)$ measured by the concentration measuring unit 28, the ammonia concentration $C_2(t, NH_3)$ measured by the post-treatment ammonia-concentration measuring unit 29, the nitrogen oxide concentration $C_0(t, NOx)$ measured by the pretreatment nitrogen-oxide-concentration measuring unit 60, and the nitrogen oxide concentration $C_2(t, NOx)$ measured by the post-treatment nitrogen-oxide-concentration measuring unit 62.

The control unit 64 calculates the new target concentration $C_1(NH_3)'$ based on the set target concentration of the ammonia concentration, the reference concentration of the concentration of nitrogen oxides, the ammonia concentration $C_2(t, NH_3)$, the nitrogen oxide concentration $C_0(t, NOx)$, and the nitrogen oxide concentration $C_2(t, NOx)$. Specifically, the control unit 64 calculates the new target concentration $C_1(NH_3)'$ by assigning respective values into $C_1(NH_3)'=C_1(NH_3)\times(1/\eta)/(C_2(t, NH_3)/C_{20}(NH_3)+0.5)$ ... (Equation 6), where $\eta$ denotes a NOx removal efficiency, and $\eta=(C_0(t, NOx)-C_2(t, NOx))/C_0(t, NOx)$.

When the control unit 64 calculates the target concentration $C_1(NH_3)'$ according to the Equation 6, when it is assumed that the initial target concentration $C_{10}(NH_3)=100$ ppm, the target concentration $C_{20}(NH_3)=5$ ppm, and $\eta=1$, when the measured ammonia concentration $C_2(t, NH_3)$ is 0 ppm, the target concentration $C_1(NH_3)'$ becomes 200 ppm. When the measured ammonia concentration $C_2(t, NH_3)$ is 2.5 ppm, the target concentration $C_1(NH_3)'$ becomes 100 ppm. When the measured ammonia concentration $C_2(t, NH_3)$ is 5 ppm, the target concentration $C_1(NH_3)'$ becomes 67 ppm. When the measured ammonia concentration $C_2(t, NH_3)$ is 10 ppm, the target concentration $C_1(NH_3)'$ becomes 40 ppm. When the measured ammonia concentration $C_2(t, NH_3)$ is 25 ppm, the target concentration $C_1(NH_3)'$ becomes 18 ppm.

Also in this case, the control unit 64 can control the operation of the injecting unit 22 in a state where the ammonia concentration $C_2(t, NH_3)$ eventually becomes about 2.5 ppm, which is half the target concentration $C_{20}(NH_3)$. In this manner, the operation of the injecting unit 22 can be favorably controlled by calculating the target concentration $C_1(NH_3)'$ by using the Equation 6, and nitrogen oxides can be decreased, while suppressing leakage of ammonia.

Furthermore, when the Equation 6 is used, the target concentration $C_1(NH_3)\eta$ can be corrected according to the NOx removal efficiency $\eta$ calculated based on the nitrogen oxide concentration $C_0(t, NOx)$ measured by the pretreatment nitrogen-oxide-concentration measuring unit 60 and the nitrogen oxide concentration $C_2(t, NOx)$ measured by the post-treatment nitrogen-oxide-concentration measuring unit 62. That is, when the measured nitrogen oxide concentration is low, the target concentration can be decreased, and when the nitrogen oxide concentration is high, the target concentration can be increased. Accordingly, the operation of the injecting unit 22 can be controlled according to the NOx removal efficiency. For example, when the NOx removal efficiency is 90%, the target concentration $C_1(NH_3)'$ is calculated at about 1.125 times the concentration when the NOx removal efficiency is 80%. Accordingly, more urea water can be injected, more nitrogen oxides remaining can be appropriately reduced, and the NOx removal efficiency can be increased.

The control unit 64 determines the catalytic power of the urea SCR catalyst in the urea SCR catalytic unit 26 based on the measurement results acquired by the post-treatment ammonia-concentration measuring unit 29 and the post-treatment nitrogen-oxide-concentration measuring unit 62. When determining that the catalytic power of the urea SCR catalyst has decreased by a certain extent or more, it is desired to perform restoration processing. The control unit 64 can determine the catalytic power of the urea SCR catalyst according to correlation between the ammonia concentration and the nitrogen oxide concentration based on the measurement results acquired by the post-treatment ammonia-concentration measuring unit 29 and the post-treatment nitrogen-oxide-concentration measuring unit 62. Specifically, when both of the ammonia concentration and the nitrogen oxide concentration are equal to or higher than a reference value, respectively, the control unit 64 can determine that the catalytic power has decreased and a reaction is not promoted. The restoration processing is for restoring the catalytic power of the urea SCR catalytic unit 26, and for example, for heating the urea SCR catalyst in the urea SCR catalytic unit 26. For example, a heater can be used as a heating unit that heats the urea SCR catalyst. Further, the control unit 64 can change combustion conditions of the diesel engine 12 to raise the temperature of flue gas. In this manner, when both of the ammonia concentration and the nitrogen oxide concentration are equal to or higher than the reference value, respectively, the control unit determines that the urea SCR catalytic unit 26 has a reduced catalytic power and a reaction between ammonia and nitrogen oxides is not caused appropriately, and performs the restoration processing, so that the reaction between ammonia and nitrogen oxides is caused preferably by the urea SCR catalytic unit 26.

In the flue gas purifying device 16, the operation of the urea SCR catalytic unit 26 is controlled by providing the concentration measuring unit 28 and the post-treatment ammonia-concentration measuring unit 29. However, an ammonia-concentration measuring unit can be provided instead of the post-treatment ammonia-concentration measuring unit 29 on the downstream side to the concentration measuring unit 28 and at a position in the urea SCR catalyst in the urea SCR catalytic unit 26. A flue gas purifying device according to another embodiment of the present invention is explained below with reference to FIG. 5.

Figure 5:
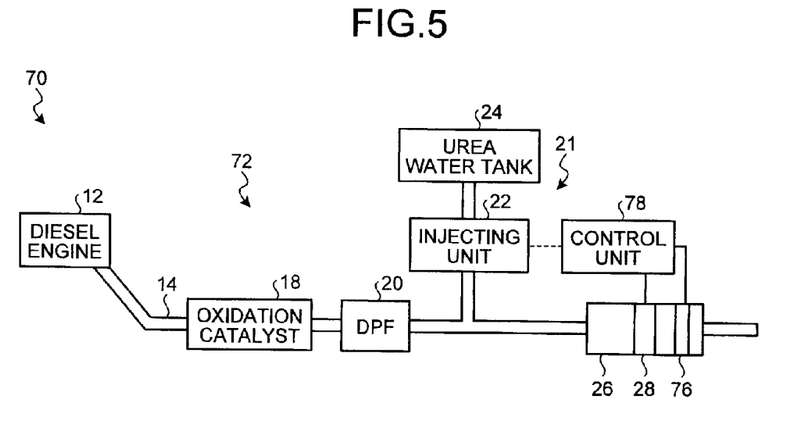
FIG. 5 is a block diagram of a schematic configuration of a vehicle according to another embodiment having the flue gas purifying device.

FIG. 5 is a block diagram of a schematic configuration of a vehicle according to another embodiment having the flue gas purifying device. A vehicle 70 shown in FIG. 5 has the same configuration as that of the vehicle 10, except of a part of a flue gas purifying device 72, and therefore explanations of like constituent elements will be omitted, and features specific to the vehicle 70 are mainly explained below. The vehicle 70 shown in FIG. 5 includes the diesel engine 12, the exhaust pipe 14, and the flue gas purifying device 72. The flue gas purifying device 72 includes the oxidation catalyst 18, the DPF 20, the urea SCR system 21, the concentration measuring unit 28, an in-treatment ammonia-concentration measuring unit 76, and a control unit 78. The urea SCR system 21 includes the injecting unit 22, the urea water tank 24, and the urea SCR catalytic unit 26. The oxidation catalyst 18, the DPF 20, the urea SCR catalytic system 21 including the injecting unit 22, the urea water tank 24, and the urea SCR catalytic unit 26, and the concentration measuring unit 28 respectively have the same configuration as those of the flue gas purifying device 16 described above, and thus detailed explanations thereof will be omitted.

The in-treatment ammonia-concentration measuring unit 76 is arranged on a downstream side to the concentration measuring unit 28 and in the urea SCR catalytic unit 26, that is, both surfaces on upstream and downstream sides thereof come in contact with the urea SCR catalytic unit 26, in an exhaust path of flue gas, to measure the concentration of ammonia in flue gas flowing in the urea SCR catalytic unit 26. A sensor having the same configuration as that of the concentration measuring unit 28 can be used as the in-treatment ammonia-concentration measuring unit 76.

The control unit 78 controls the operation of the injecting unit 22 based on the measurement results transmitted from the concentration measuring unit 28 and the in-treatment ammonia-concentration measuring unit 76. The control unit 78 can calculate the target concentration $C_1(NH_3)'$ according to the same control method as that of the control unit 30, except of using the ammonia concentration measured by the in-treatment ammonia-concentration measuring unit 76 instead of the ammonia concentration measured by the post-treatment ammonia-concentration measuring unit 29. That is, the operation of the injecting unit 22 can be controlled according to various calculation methods of from the Equation 1 to the Equation 3.

As in the flue gas purifying device 72, ammonia measured by the in-treatment ammonia-concentration measuring unit 76 can be reduced by the urea SCR catalyst on the downstream side to the in-treatment ammonia-concentration measuring unit 76 by providing the in-treatment ammonia-concentration measuring unit 76 to be arranged on the downstream side to the concentration measuring unit 28 in the urea SCR catalyst. Accordingly, ammonia discharged from the flue gas purifying device 72 can be further decreased, and ideally even decreased to zero.

Also, the control unit can calculate an estimate of an injection amount and injection timing of urea water based on operating conditions such as accelerator opening, velocity, and engine speed. Specifically, the produced amount and temperature of nitrogen monoxide are calculated based on the operating conditions by using a data map showing a relation between pre-calculated operating conditions and an amount of emission and the temperature of nitrogen monoxide, to calculate the estimate (primary target value) of the injection amount and injection timing of urea water based on the calculated produced amount and the temperature of nitrogen monoxide. The control unit 78 then calculates the target concentration at a measurement position of the concentration measuring unit 28 based on the measurement result acquired by at least the post-treatment ammonia-concentration measuring unit 29 (or the in-treatment ammonia-concentration measuring unit 76) as described above, and compares the target concentration with the measurement result acquired by the concentration measuring unit 28, to correct the estimate (primary target value) of the injection amount and injection timing of urea water based on a comparison result thereof. The control unit controls the operation of the injecting unit based on the corrected injection amount and injection timing of urea water. An increase and decrease in the amount of nitrogen oxides contained in flue gas can be predicted beforehand by calculating the estimate of the injection amount and injection timing of urea water according to the operating conditions in this manner, thereby enabling to calculate the injection amount and injection timing of urea water more accurately and promptly and decrease nitrogen oxides more appropriately.

When the target concentration of the ammonia concentration is set constant regardless of the operating conditions, the operating conditions do not need to be detected, and the number of measuring units can be decreased, thereby enabling to simplify the device configuration of the flue gas purifying device.

It is desired that the flue gas purifying device further includes a temperature measuring unit that detects the temperature of the urea SCR catalyst, stores a history of the temperature of the urea SCR catalyst and the measurement results acquired by the respective measuring units, calculates the amount of ammonia adsorbed on the urea SCR catalyst to calculate the amount of ammonia required for purifying nitrogen oxides in flue gas based on the calculated amount of ammonia, and injects urea water based on the calculated amount of ammonia. In this manner, by controlling the injection amount of urea water, taking the amount of ammonia adsorbed on the urea SCR catalyst into consideration, the amount of ammonia adsorbed on the urea SCR catalyst can be set to an amount with which a reaction between ammonia and nitrogen oxides can be caused highly efficiently by the urea SCR catalyst. Accordingly, the amount of ammonia leaking from the exhaust pipe can be decreased further. Further, because the reaction between ammonia and nitrogen oxides can be caused highly efficiently by the urea SCR catalyst, the urea SCR catalyst can be decreased and the size thereof can be also decreased.

The flue gas purifying device can further detect whether ammonia is appropriately produced from injected urea water to control production thereof according to a detection result thereof. A flue gas purifying device according to still another embodiment of the present invention is explained below with reference to FIG. 6.

Figure 6:
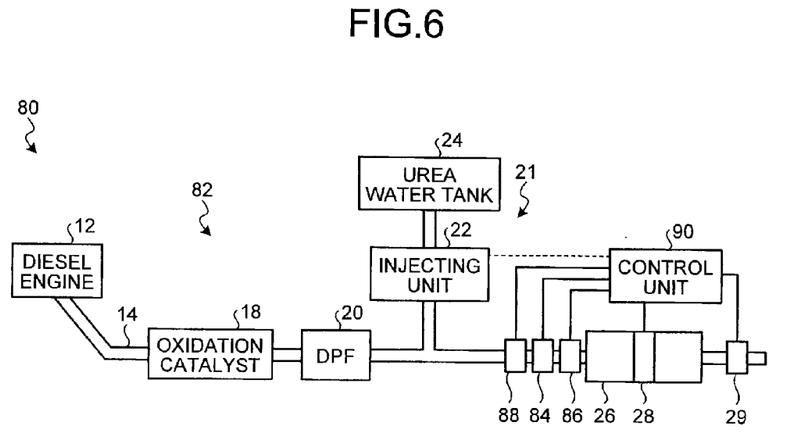
FIG. 6 is a block diagram of a schematic configuration of a vehicle according to another embodiment having the flue gas purifying device.

FIG. 6 is a block diagram of a schematic configuration of a vehicle according to another embodiment having the flue gas purifying device. A vehicle 80 shown in FIG. 6 has the same configuration as that of the vehicle 10, except of a part of a flue gas purifying device 82, and therefore explanations of like constituent elements will be omitted, and features specific to the vehicle 80 are mainly explained below. The vehicle 80 shown in FIG. 6 includes the diesel engine 12, the exhaust pipe 14, and the flue gas purifying device 82. The flue gas purifying device 82 includes the oxidation catalyst 18, the DPF 20, the urea SCR system 21, the concentration measuring unit 28, the post-treatment ammonia-concentration measuring unit 29, a pretreatment ammonia-concentration measuring unit 84, an isocyanic-acid-concentration measuring unit 86, a temperature adjusting unit 88, and a control unit 90. The urea SCR system 21 includes the injecting unit 22, the urea water tank 24, and the urea SCR catalytic unit 26. The oxidation catalyst 18, the DPF 20, the urea SCR catalytic system 21 including the injecting unit 22, the urea water tank 24, and the urea SCR catalytic unit 26, the concentration measuring unit 28, and the post-treatment ammonia-concentration measuring unit 29 respectively have the same configuration as those of the flue gas purifying device 16 described above, and thus detailed explanations thereof will be omitted.

The pretreatment ammonia-concentration measuring unit 84 is arranged on an upstream side of the urea SCR catalytic unit 26, specifically, in the exhaust pipe 14 on a downstream side to the DPF 20 and the injecting unit 22 and on an upstream side to the urea SCR catalytic unit 26, in an exhaust path of flue gas, to measure the concentration of ammonia in flue gas supplied to the urea SCR catalytic unit 26. The pretreatment ammonia-concentration measuring unit 84 includes a measuring unit body, an optical fiber, a measuring cell, and a light receiving unit as in the concentration measuring unit 28. Because a measuring method of the ammonia concentration by the pretreatment ammonia-concentration measuring unit 84 is the same as that of the concentration measuring unit 28, explanations thereof will be omitted. The pretreatment ammonia-concentration measuring unit 84 continuously measures the ammonia concentration contained in flue gas before passing through the urea SCR catalytic unit 26, and transmits a measurement result to the control unit 90.

The isocyanic-acid-concentration measuring unit 86 is arranged on the upstream side of the urea SCR catalytic unit 26 in the exhaust path of flue gas, to measure the concentration of isocyanic acid in flue gas supplied to the urea SCR catalytic unit 26. A sensor having the same configuration as that of the concentration measuring unit 28 can be used as the isocyanic-acid-concentration measuring unit 86. Specifically, the isocyanic-acid-concentration measuring unit 86 causes a light emitting unit to emit laser beams in a wavelength region absorbed by isocyanic acid, and receives light emitted from the light emitting unit and having passed in flue gas by a light receiving unit, thereby enabling to detect the concentration of isocyanic acid in flue gas based on the intensity of received light. The isocyanic-acid-concentration measuring unit 86 continuously measures the concentration of isocyanic acid contained in flue gas before passing through the urea SCR catalytic unit 26, and transmits a measurement result to the control unit 90. Various sensors such as a sensor that detects only isocyanic acid without detecting nitrogen oxides and ammonia in flue gas and measures the concentration thereof can be used as the isocyanic-acid-concentration measuring unit.

The temperature adjusting unit 88 is provided in the exhaust pipe 14 on the upstream side of the urea SCR catalytic unit 26 in the exhaust path of flue gas, specifically, in the exhaust pipe 14 between the injecting unit 22 and the urea SCR catalytic unit 26, to adjust the temperature of flue gas flowing in the exhaust pipe 14. The temperature adjusting unit 88 heats or cools flue gas flowing in the exhaust pipe 14 by heating or cooling the exhaust pipe 14, to adjust the temperature of flue gas. Various heating mechanisms and cooling mechanisms such as a heater, a Peltier element, an air-cooling device, and the like can be used as the temperature adjusting unit 88.

The control unit 90 controls the operation of the injecting unit based on the measurement results acquired by the concentration measuring unit 28 and the post-treatment ammonia-concentration measuring unit 29, and adjusts the temperature of flue gas by the temperature adjusting unit 88 based on the measurement results transmitted from the pretreatment ammonia-concentration measuring unit 84 and the isocyanic-acid-concentration measuring unit 86. Because the operation of the injection unit controlled by the control unit 90 based on the measurement results acquired by the concentration measuring unit 28 and the post-treatment ammonia-concentration measuring unit 29 is the same as the control performed by the control unit 30, explanations thereof will be omitted. A method of adjusting the temperature of flue gas performed by the temperature adjusting unit 88 based on the measurement results transmitted from the pretreatment ammonia-concentration measuring unit 84 and the isocyanic-acid-concentration measuring unit 86 is explained below.

In urea water injected from the urea-water injecting unit 22, isocyanic acid is produced from urea, and ammonia is produced from isocyanic acid due to heat of the exhaust pipe 21 and heat of flue gas. However, if the reaction is insufficient, a part of urea water is maintained in the state of urea or in the state of isocyanic acid, so as not to produce ammonia. To solve this problem, the control unit 90 determines whether injected urea water is appropriately turned into ammonia based on the concentration of at least one of ammonia and isocyanic acid in flue gas before passing through the urea SCR catalytic unit 26, transmitted from the pretreatment ammonia-concentration measuring unit 84 and the isocyanic-acid-concentration measuring unit 86. Specifically, when the isocyanic acid concentration is equal to or higher than a certain level, the control unit 90 determines that the reaction is not caused appropriately. When a theoretical ammonia concentration is calculated from the injection amount of urea water and a measurement value acquired by the pretreatment ammonia-concentration measuring unit 84 is lower than the calculated value by a certain concentration, the control unit 90 also determines that the reaction is not caused appropriately. When determining that the reaction is not caused appropriately and urea water and isocyanic acid remain in flue gas, the control unit 90 causes the temperature adjusting unit 88 to raise the temperature of flue gas to promote production of ammonia from urea water and isocyanic acid, so that ammonia is produced at the time of arrival of flue gas at the urea SCR catalytic unit 26.

The vehicle 80 and the flue gas purifying device 82 have the configuration described above, and flue gas discharged from the diesel engine 12 flows in the exhaust pipe 14, and passes through the oxidation catalyst 18 and the DPF 20 to decrease PM. Thereafter, the flue gas further flows in the exhaust pipe 14, and after urea water is injected from the injecting unit 22, flows in a region of the exhaust pipe 14 where the temperature adjusting unit 88 is arranged. The flue gas then flows in a region of the exhaust pipe 14 where the pretreatment ammonia-concentration measuring unit 84 and the isocyanic-acid-concentration measuring unit 86 are arranged. At that time, the respective concentration measuring units respectively measure the concentration of a substance to be measured in the flue gas. Thereafter, the flue gas passes through the urea SCR catalytic unit 26 and the concentration measuring unit 28, flows in the region of the exhaust pipe 14 where the post-treatment ammonia-concentration measuring unit 29 is arranged, and is discharged to the outside. While the flue gas passes through the urea SCR catalyst, nitrogen oxides contained in the flue gas and ammonia produced from urea water reacts with each other to reduce nitrogen oxides. The respective concentration measuring units measure the concentration of a substance to be measured in the flue gas, respectively.

The flue gas purifying device 82 can produce ammonia appropriately from urea water and appropriately cause a reaction between ammonia and nitrogen oxides by adjusting the temperature of flue gas by the temperature adjusting unit 88, based on the measurement results acquired by the pretreatment ammonia-concentration measuring unit 84 and the isocyanic-acid-concentration measuring unit 86.

In the embodiments described above, while the temperature adjusting unit 88 is provided in a separated manner, the present invention is not limited thereto. When the temperature of flue gas can be adjusted by an internal combustion engine such as a diesel engine, the internal combustion engine can be used as a temperature adjusting unit to adjust the temperature of the flue gas.

INDUSTRIAL APPLICABILITY

As described above, the flue gas purifying device according to the present invention is useful for purifying flue gas discharged from a burning appliance, and the flue gas purifying device is particularly suitable for purifying flue gas discharged from a diesel engine mounted on a vehicle.

REFERENCE SIGNS LIST

10, 50, 70, 80 vehicle
12 diesel engine
14 exhaust pipe
16, 52, 72, 82 flue gas purifying device
18 oxidation catalyst
20 DPF
21 urea SCR system
22 injecting unit
24 urea water tank
26 urea SCR catalytic unit
28 concentration measuring unit
29 post-treatment ammonia-concentration measuring unit
30, 64, 78, 90 control unit
40 measuring unit body
42 optical fiber
44 measuring cell
46 light receiving unit
60 pretreatment nitrogen-oxide-concentration measuring unit
62 post-treatment nitrogen-oxide-concentration measuring unit
76 in-treatment ammonia-concentration measuring unit
84 pretreatment ammonia-concentration measuring unit
86 isocyanic-acid-concentration measuring unit
88 temperature adjusting unit

The invention claimed is:

1. A flue gas purifying device that reduces nitrogen oxides contained in flue gas discharged from a burning appliance, the device comprising:
    a flue-gas flow path that guides flue gas discharged from the burning appliance;
    a urea-water injecting unit that injects urea water into the flue-gas flow path;
    a catalytic unit that includes a urea SCR catalyst that promotes a reaction between ammonia produced from injected urea water and the nitrogen oxides, and a support mechanism arranged inside of the flue-gas flow path to support the urea SCR catalyst in the flue-gas flow path, and that is arranged on a downstream side to a position where the urea water is injected in a flow direction of the flue gas;
    a first ammonia-concentration measuring unit that measures a concentration of ammonia in flue gas at a measurement position in a region where the catalytic unit is arranged;
    a second ammonia-concentration measuring unit arranged downstream of the first ammonia-concentration measuring unit in a flow direction of the flue gas, to measure a concentration of ammonia in the flue gas; and
    a control unit that controls injection of urea water by the urea-water injecting unit based on measurement results acquired by the first and second ammonia-concentration measuring units,
    wherein the control unit is configured to:
    set a target concentration of the second ammonia-concentration measuring unit, which is not updated;
    update a target concentration of the first ammonia-concentration measuring unit based on the measurement result acquired by the second ammonia-concentration measuring unit after comparing the measurement result acquired by the second ammonia-concentration measuring unit to the target concentration of the second ammonia-concentration measuring unit; and
    control the injection of urea water by the urea-water injecting unit so that a measurement result acquired by the first ammonia-concentration measuring unit becomes the target concentration of the first ammonia-concentration measuring unit.

2. The flue gas purifying device according to claim 1, wherein each of the first ammonia-concentration measuring unit and the second ammonia-concentration measuring unit comprises:
    a measuring unit body that outputs a laser beam;
    an optical fiber that is connected to the measuring unit body, and through which the laser beam output from the measuring unit body is passed;
    a measuring unit that is connected to the optical fiber, and includes a route through which the laser beam output from the optical fiber passes and an output unit that outputs the laser beam passed through the route; and a receive unit that receives the laser beam output from the output unit, converts the laser beam received to a light receiving signal and output the light receiving signal to the measuring unit body, wherein the measuring unit body receives the light receiving signal output from the receive unit and calculates an ammonia concentration by comparing an intensity of the laser beam output from the measuring unit body with an intensity calculated from the light receiving signal received.

3. The flue gas purifying device according to claim 1, wherein the target concentration of the first ammonia-concentration measuring unit is calculated using a value by dividing the measurement result acquired by the second ammonia-concentration measuring unit by the target concentration of the second ammonia-concentration measuring unit.

4. The flue gas purifying device according to claim 1, wherein the control unit controls injection of urea water by the urea-water injecting unit, such that $C_1(NH_3)'$ is $C_1(NH_3)'=C_1(NH_3)/(C_2(t, NH_3)/C_{20}(NH_3)+0.5)$ and the measurement result acquired by the first ammonia-concentration measuring unit becomes $C_1(NH_3)'$, where $C_1(NH_3)$ is a calculation basis of the target concentration at a measurement position of the first ammonia-concentration unit, $C_1(NH_3)'$ is the target concentration at the measurement position of the first ammonia-concentration measuring unit, $C_2(t, NH_3)$ is the measurement result acquired by the second ammonia-concentration measuring unit; and $C_{20}(NH_3)$ is the target concentration at a measurement position of the second ammonia-concentration measuring unit, wherein at startup, an initial target concentration $C_{10}(NH_3)$, which is a preset value, is assigned as $C_1(NH_3)$, and from next, $C_1(NH_3)'$ calculated by a calculation immediately before, is assigned as $C_1(NH_3)$.

5. The flue gas purifying device according to claim 1, wherein the control unit controls injection of urea water by the urea-water injecting unit, such that $C_1(NH_3)'$ is $C_1(NH_3)'=C_1(NH_3)-n\times(C_2(t, NH_3)-C_{20}(NH_3)\times0.5)$ and the measurement result acquired by the first ammonia-concentration measuring unit becomes $C_1(NH_3)'$, where $C_1(NH_3)$ is a calculation basis of the target concentration at a measurement position of the first ammonia-concentration unit, $C_1(NH_3)'$ is the target concentration at the measurement position of the first ammonia-concentration measuring unit, $C_2(t, NH_3)$ is the measurement result acquired by the second ammonia-concentration measuring unit;

$C_{20}(NH_3)$ is the target concentration at a measurement position of the second ammonia-concentration measuring unit, and n is an arbitrary constant, wherein at startup, an initial target concentration $C_{10}(NH_3)$, which is a preset value, is assigned as $C_1(NH_3)$, and from next, $C_1(NH_3)'$ calculated by a calculation immediately before, is assigned as $C_1(NH_3)$.

6. The flue gas purifying device according to claim 1, wherein the control unit controls injection of urea water by the urea-water injecting unit, such that $C_1(NH_3)'$ is $C_1(NH_3)'=C_1(NH_3)\times\sin(t/T)/(C_2(t, NH_3)/C_{20}(NH_3)+0.5)$ and the measurement result acquired by the first ammonia-concentration measuring unit becomes $C_1(NH_3)'$, where $C_1(NH_3)$ is a calculation basis of the target concentration at a measurement position of the first ammonia-concentration unit, $C_1(NH_3)'$ is the target concentration at the measurement position of the first ammonia-concentration measuring unit, $C_2(t, NH_3)$ is the measurement result acquired by the second ammonia-concentration measuring unit;

$C_{20}(NH_3)$ is the target concentration at a measurement position of the second ammonia-concentration measuring unit, T is an arbitrary cycle, and t is time wherein at startup, an initial target concentration $C_{10}(NH_3)$, which is a preset value, is assigned as $C_1(NH_3)$, and from next, $C_1(NH_3)'$ calculated by a calculation immediately before, is assigned as $C_1(NH_3)$.

7. The flue gas purifying device according to claim 1, further comprising a pretreatment nitrogen-oxide-concentration measuring unit arranged upstream of the catalytic unit in the flow direction of the flue gas to measure a concentration of nitrogen oxide in flue gas flowing into the catalytic unit, wherein the control unit controls injection of urea water by the urea-water injecting unit, such that $C_1(NH_3)'$ is $C_1(NH_3)'=C_1(NH_3)\times(C_0(t, NOx)/C_{00}(NOx))/C_2(t, NH_3)/C_{20}(NH_3)+0.5)$ and the measurement result acquired by the first ammonia-concentration measuring unit becomes $C_1(NH_3)'$, where $C_1(NH_3)$ is a calculation basis of the target concentration at a measurement position of the first ammonia-concentration unit, $C_1(NH_3)'$ is the target concentration at the measurement position of the first ammonia-concentration measuring unit, $C_2(t, NH_3)$ is the measurement result acquired by the second ammonia-concentration measuring unit, $C_{20}(NH_3)$ is the target concentration at a measurement position of the second ammonia-concentration measuring unit, $C_0(t, NOx)$ is a measurement result acquired by the pretreatment nitrogen-oxide-concentration measuring unit, and $C_{00}(NOx)$ is a reference concentration at a measurement position of the pretreatment nitrogen-oxide-concentration measuring unit, wherein at startup, an initial target concentration $C_{10}(NH_3)$, which is a preset value, is assigned as $C_1(NH_3)$, from next $C_1(NH_3)'$ calculated by a calculation immediately before, is assigned as $C_1(NH_3)$ and $C_{00}(NOx)$ is preset as an initial value.

8. The flue gas purifying device according to claim 1, further comprising a post-treatment nitrogen-oxide-concentration measuring unit arranged on a downstream side to the catalytic unit in a flow direction of the flue gas to measure a concentration of nitrogen oxide in flue gas having passed through the urea SCR catalyst, wherein the control unit controls injection of urea water by the urea-water injecting unit, such that $C_1(NH_3)'$ is $C_1(NH_3)'=C_1(NH_3)\times(C_2(t, NOx)/C_{20}(NOx))/C_2(t, NH_3)/C_{20}(NH_3)+0.5)$ and the measurement result acquired by the first ammonia-concentration measuring unit becomes $C_1(NH_3)'$, where $C_1(NH_3)$ is a calculation basis of the target concentration at a measurement position of the first ammonia-concentration unit, $C_1(NH_3)'$ is the target concentration at the measurement position of the first ammonia-concentration measuring unit, $C_2(t, NH_3)$ is the measurement result acquired by the second ammonia-concentration measuring unit;

$C_{20}(NH_3)$ is the target concentration at a measurement position of the second ammonia-concentration measuring unit, $C_2(t, NOx)$ is a measurement result acquired by the post-treatment nitrogen-oxide-concentration measuring unit, and $C_{20}(NOx)$ is a reference concentration at a measurement position of the post-treatment nitrogen-oxide-concentration measuring unit, wherein at startup, an initial target concentration $C_{10}(NH_3)$, which is a preset value, is assigned as $C_1(NH_3)$, and from next, $C_1(NH_3)'$ calculated by a calculation immediately before, is assigned as $C_1(NH_3)$.

9. The flue gas purifying device according to claim 1, further comprising a pretreatment nitrogen-oxide-concentration measuring unit arranged on an upstream side to the catalytic unit in a flow direction of the flue gas to measure a concentration of nitrogen oxide in flue gas flowing into the catalytic unit, and a post-treatment nitrogen-oxide-concentration measuring unit arranged on a downstream side to the catalytic unit in the flow direction of the flue gas to measure a concentration of nitrogen oxides in flue gas having passed through the urea SCR catalyst, wherein the control unit controls injection of urea water by the urea-water injecting unit, such that $C_1(NH_3)'$ is $C_1(NH_3)'=C_1(NH_3)\times(1/\eta)/(C_2(t, NH_3)/C_{20}(NH_3)+0.5)$ and the measurement result acquired by the first ammonia-concentration measuring unit becomes $C_1(NH_3)'$, where $C_1(NH_3)$ is a calculation basis of the target concentration at a measurement position of the first ammonia-concentration unit, $C_1(NH_3)'$ is the target concentration at the measurement position of the first ammonia-concentration measuring unit, $C_2(t, NH_3)$ is the measurement result acquired by the second ammonia-concentration measuring unit, $C_{20}(NH_3)$ is the target concentration at a measurement position of the second ammonia-concentration measuring unit, $C_0(t, NOx)$ is a measurement result acquired by the pretreatment nitrogen-oxide-concentration measuring unit, $C_2(t, NOx)$ is a measurement result acquired by the post-treatment nitrogen-oxide-concentration measuring unit, and $\eta$ is $(C_0(t, NOx)-C_2(t, NOx))/C_0(t, NOx)$, wherein at startup, an initial target concentration $C_{10}(NH_3)$, which is a preset value, is assigned as $C_1(NH_3)$, and from next, $C_1(NH_3)'$ calculated by a calculation immediately before, is assigned as $C_1(NH_3)$.

10. The flue gas purifying device according to claim 1, wherein the second ammonia-concentration measuring unit is provided in the catalytic unit so as to measure an ammonia concentration in a region where the catalytic unit is arranged.

11. The flue gas purifying device according to claim 1, wherein the second ammonia-concentration measuring unit is provided downstream of the catalytic unit in the flow direction of the flue gas so as to measure an ammonia concentration of the flue gas passing through the urea SCR catalyst.

* * * * *